United States Patent
Gray, III et al.

(10) Patent No.: US 7,602,406 B2
(45) Date of Patent: *Oct. 13, 2009

(54) COMPOSITING IMAGES FROM MULTIPLE SOURCES

(75) Inventors: Donald M. Gray, III, San Francisco, CA (US); John Allen Tardif, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 422 days.

This patent is subject to a terminal disclaimer.

(21) Appl. No.: 10/968,703

(22) Filed: Oct. 19, 2004

(65) Prior Publication Data

US 2005/0099434 A1     May 12, 2005

Related U.S. Application Data

(63) Continuation of application No. 09/702,505, filed on Oct. 31, 2000, now Pat. No. 6,903,753.

(51) Int. Cl.
    *G09G 5/00*     (2006.01)
(52) U.S. Cl. ............................................. 345/634
(58) Field of Classification Search ................. 345/592, 345/611, 629, 634, 636, 506; 348/564, 565, 348/584, 586, 588; 725/40–43
See application file for complete search history.

(56) References Cited

U.S. PATENT DOCUMENTS

| | | | | |
|---|---|---|---|---|
| 4,454,506 A | * | 6/1984 | Netravali et al. | 345/611 |
| 4,642,621 A | * | 2/1987 | Nemoto et al. | 345/634 |
| 5,005,011 A | * | 4/1991 | Perlman et al. | 345/540 |
| 5,258,843 A | * | 11/1993 | Truong | 345/634 |
| 5,434,590 A | * | 7/1995 | Dinwiddie et al. | 345/634 |

(Continued)

FOREIGN PATENT DOCUMENTS

JP     7-298217     * 11/1995

OTHER PUBLICATIONS

Michael B. Jones, The Microsoft Interactive TV System: An Experience Report, Jul. 1997, Microsoft Corporation, pp. 1-16.*

(Continued)

*Primary Examiner*—Jeffery A Brier
(74) *Attorney, Agent, or Firm*—Workman Nydegger

(57) ABSTRACT

Systems and methods for compositing an image directly from multiple source image data for reducing system memory footprint and bandwidth and for improving color quality of the image. The image is divided into spans, lines, and slices. Each line includes at least one span and each slice includes at least one line. All lines in a slice have spans associated with identical sources. An image is composited by reading the image data directly from one or more sources of each span. If necessary, the sources are blended. A control structure is used to provide the image context and identifies the sources of the spans. The control structure includes headers for each data stream from each source of each span. Also, the color quality of the image is improved by reducing the number of color space conversions that occur as the image is composited. All sources in the same color space are blended before being blended with sources from other color spaces. Preferably, no more than a single color conversion is required.

8 Claims, 7 Drawing Sheets

U.S. PATENT DOCUMENTS

| | | | | |
|---|---|---|---|---|
| 5,745,909 | A | * | 4/1998 | Perlman et al. .............. 715/513 |
| 5,764,201 | A | * | 6/1998 | Ranganathan ................ 345/3.3 |
| 5,959,680 | A | * | 9/1999 | Bril ............................ 348/446 |
| 6,122,751 | A | * | 9/2000 | Janssens et al. ............. 713/600 |
| 6,208,354 | B1 | * | 3/2001 | Porter ........................ 345/634 |
| 6,252,610 | B1 | * | 6/2001 | Hussain ...................... 345/506 |
| 6,442,206 | B1 | * | 8/2002 | Hrusecky ............... 375/240.21 |
| 6,466,224 | B1 | * | 10/2002 | Nagata et al. ............... 345/592 |
| 6,481,012 | B1 | * | 11/2002 | Gordon et al. ................ 725/54 |
| 6,608,630 | B1 | * | 8/2003 | MacInnis et al. ............ 345/634 |
| 6,631,403 | B1 | * | 10/2003 | Deutsch et al. ............. 709/217 |
| 6,801,575 | B1 | * | 10/2004 | Crinon .................. 375/240.26 |
| 2005/0146538 | A1 | | 7/2005 | Gray |
| 2006/0284884 | A1 | * | 12/2006 | Cahill, III ................... 345/592 |

OTHER PUBLICATIONS

Office Action dated Nov. 14, 2008 cited in U.S. Appl. No. 11/073,826.
Office Action dated Feb. 11, 2003 cited in related U.S. Appl. No. 09/702,505.
Office Action dated Jul. 8, 2003 cited in related U.S. Appl. No. 09/702,505.
Office Action dated Oct. 21, 2003 cited in related U.S. Appl. No. 09/702,505.
Office Action dated Mar. 1, 2004 cited in related U.S. Appl. No. 09/702,505.
Office Action dated Jul. 23, 2004 cited in related U.S. Appl. No. 09/702,505.
Notice of Allowance dated Jan. 28, 2005 cited in related U.S. Appl. No. 09/702,505.
Office Action dated Jul. 9, 2008 cited in related U.S. Appl. No. 11/073,826.

* cited by examiner

COMPOSITING IMAGES FROM MULTIPLE SOURCES

CROSS-REFERENCE TO RELATED APPLICATIONS

The present application is a continuation application of commonly-assigned U.S. patent application Ser. No. 09/702,505 filed Oct. 31, 2000, entitled "Compositing Images from Multiple Sources" and which is incorporated herein by reference.

BACKGROUND OF THE INVENTION

1. The Field of the Invention

The present invention relates to systems and methods for compositing an image. More particularly, the present invention relates to systems and methods for compositing an image by minimizing the memory required to composite the image and for improving the color quality of the image.

2. Background and Related Art

Televisions, computer monitors, and other display devices are capable of displaying many different kinds of signals, data, and images. Instead of receiving signals over a line of sight antenna, more and more people are receiving digital television signals over cable and satellite systems. These media are also being increasingly used to connect people with the Internet, and many people are beginning to have television and Internet access over the same medium. As a result, the display devices and as well as the set top boxes that receive those signals and data are being required to effectively handle those signals and data in order to display images that may be generated from those signals and data.

Displaying these images can be a difficult task for a variety of reasons. For example, consider how ordinary digital data, such as the data encountered on the Internet, is operated on by a set top box before an image may be generated from the digital data and displayed to the user. Because the Internet data can include a variety of graphic data, video streams, and other data types, it is necessary to identify the sources of data that will be used to generate the image. The generation of an image involves compositing the image from the data of the identified sources.

Compositing the Internet data is a lengthy process that often involves multiple data buffers. If the image to be displayed includes, for example, data from both a video source and a graphic source, it is often necessary to have buffers for both sampling the video and graphic data as well as buffers for resizing the video and graphic data. After this data has been sampled and resized, the data is ready to be composited into an image and displayed on the display device.

The final step of compositing the image often requires a system of full size image buffers. Typically, a double image buffer is used to display images that are being composited. While one of the image buffers containing a composited image is being displayed, the other image buffer is used to composite the next image. After the second image buffer has been composited, it is displayed while the image buffer that just finished being displayed is used to composite the next image. This process is repeated for each image being displayed on the display device.

Processing data in this manner requires a significant amount of memory, but newer technologies such as High Definition Television (HDTV) require even more memory in order to provide a double image buffer to both composite and display the images. The images that are included in HDTV have more lines in each image and more pixels in each line. Also the data that describes each pixel is often more complex. As a result, significant bandwidth is required to accommodate HDTV data. In fact, it is usually necessary to compress HDTV signals in order to fit within available bandwidths. As a result, the data that describes the images of HDTV requires significant resources because of the memory requirements. This amount of memory can be expensive, especially in consumer devices that are sensitive to cost.

Another problem associated with displaying images generated from various types of data on a display device is that the graphics on a particular image often overlap. In some instances, only the top image is visible to the user. However, the underlying graphics are usually composited without regard to whether they would be visible to the user. Compositing the data included in a graphic that will not be visible to a user is not only an inefficient use of time, but is also an expensive use of memory, particularly when there are several portions of the image that may overlap. In the case of HDTV, this can be a significant problem because a large amount of data is used to define and describe each portion of the image.

Another drawback of image composition is that when an image is composited, the color or video quality of the image often suffers because not all of the data that is used to generate the image is in the same color space. Some of the data is in the Red Green Blue (RGB) color space, and some of the data may be in the YCbCr (referred to herein as YUV) color space where the Y represents the luma component and the U and V represent the color difference or chrominance components. The data can also be represented in other color spaces. As a result, compositing an image for display may require the data to be converted from one color space to another color space several times. Each time a color space is converted to another color space, information is lost or distorted, and the lost or distorted information translates to poorer image quality as well as poorer image color.

This problem is particularly evident when a particular portion of an image is derived from more than one source. In these situations, the sources are typically converted to a single color space and blended. This often requires a color space conversion matrix for each separate source. Because each source may be converted, the conversion matrices, which are significant pieces of logic, are implemented multiple times. After the data sources have been converted to a common color space or format, they are blended together to produce an appropriate output. The main drawback is that each color space conversion degrades the ultimate output.

BRIEF SUMMARY OF THE INVENTION

Before an image is displayed on a display device, all of the graphic data, video data, and other data is composited. The systems and methods for compositing an image provided by the present invention effectively minimize the memory requirements for displaying an image by reading the data being displayed directly from the data sources. By reading the data directly from the sources, the double buffering requirements can be significantly reduced or eliminated. In effect, reading image data directly from image data sources saves memory bandwidth and memory footprint. For example, a traditional design reads image source data into hardware, outputs a composited frame to memory, and reads the composited frame from memory to the video output hardware. The systems and methods of the present invention eliminate the steps of outputting a composited frame to memory and reading the composited frame from memory to the video output hardware.

The image to be displayed is divided into spans, lines, and slices. Each line typically has one or more spans and each slice has at least one line. The vertically adjacent spans in each line of each slice are from the same source. As each line is rasterized, the sources that correspond to each span within the line are read at the appropriate time. This enables the image to be composited in real time. The amount of data read from each source corresponds to the amount of pixel data needed for the pixels in a particular span.

An advantage of compositing an image in this manner is that portions of the image, such as graphics, that are either translucent or opaque can be handled more efficiently because each span can have more than one source. If the portion of the image being rasterized is translucent, then the various sources are simultaneously read, blended and displayed. If the portion of the image being rasterized is opaque, then only the source that corresponds to the visible portion is read. This enhances efficiency because the sources that are not visible are not read and do not consume processing time.

Another feature of the present invention is the ability to eliminate flicker that may be associated with some portions of an image by filtering the image data. Flickering may be caused, for example, by an interlaced screen where a line of a graphic is only displayed half of the time. When the span that represents the line is encountered, the data from vertically adjacent spans can be used as sources that are read and blended with the current span data. Blending the data in this manner eliminates the flicker.

The present invention also has the feature of improving the video or color quality of an image by minimizing the number of times a color space conversion occurs. This is accomplished by blending all sources having the same color space before blending sources having different color spaces. Thus, rather than implement logic to convert each separate source, the sources having the same color space are blended before they are converted to a different color space. In this manner, it is possible to only perform a single color space conversion. Because color space conversions result in lower quality or poorer color, performing a single color space conversion improves the quality of the image that is ultimately displayed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As used herein, "image" refers to what is shown on a display device and can include both the active pixel areas and the blank pixel areas. An image can be a frame and can include video data, graphic data, Internet data and other types of data that are displayed on a display device. Images are typically displayed one after another on the display device.

For a given display, there are typically many different windows that are being shown. For example, when a user is viewing Internet data, there may be some synthetically generated windows or borders, three dimensional graphics, a video stream and other data displayed in each image. Each image generated for this type of display is composited by the present invention directly from the data sources. Thus, when a portion of video data is needed, that portion of the video data is simply read from the source and displayed.

The present invention extends to both methods and systems for compositing an image. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
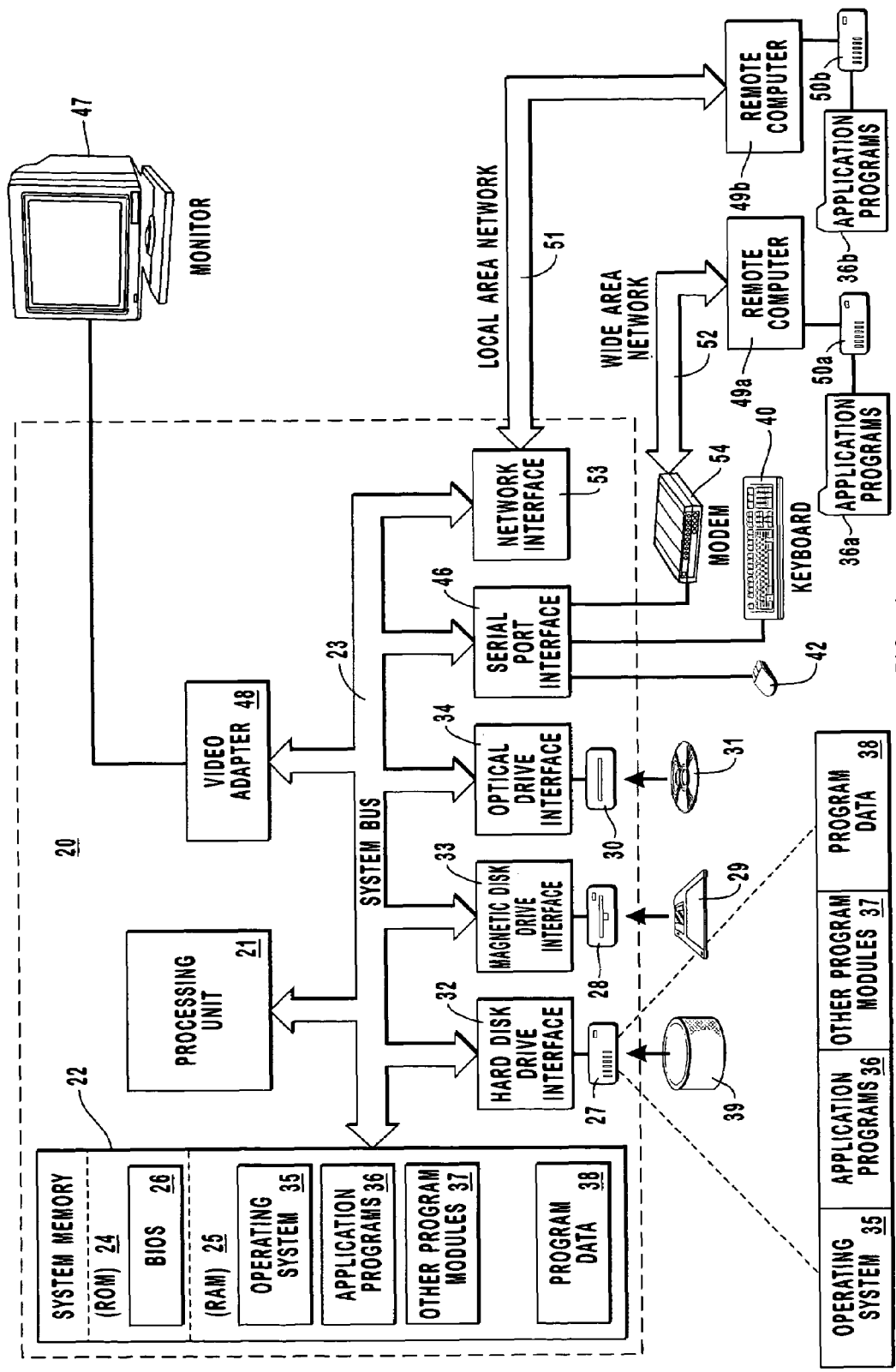
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including set top boxes, personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
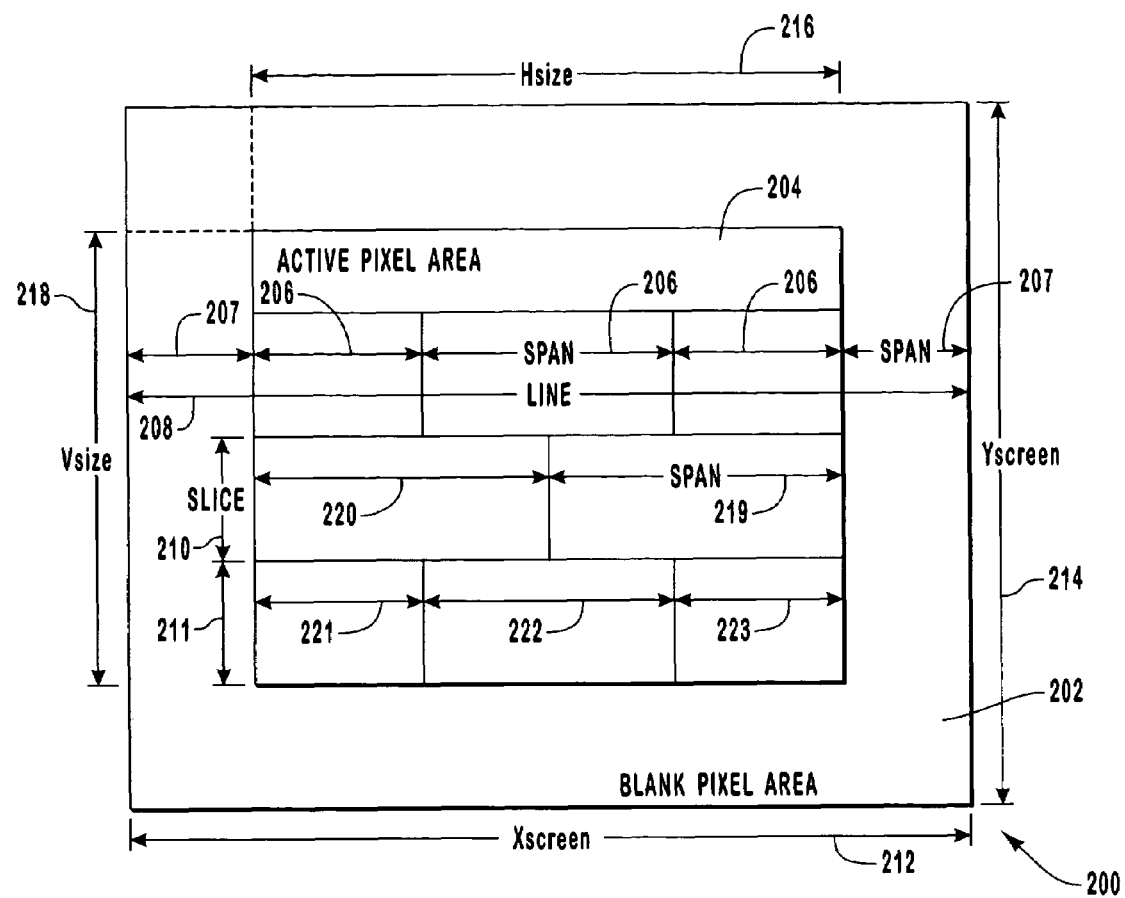
FIG. 2 is a block diagram illustrating the slices, lines, and spans of an image including active and blank pixel areas.

FIG. 2 is a block diagram that generically illustrates an image 200. The image 200 includes an active pixel area 204 and a blank pixel area 202. Typically, the active pixel area 204 is contained within the blank pixel area 202. The active pixel area 204 is used to display video, graphics, text, colors and the like. The image 200 can be either a frame or a field for display. Usually, images are displayed one after another. The width of the image 200 is described by the Xscreen 212 and the height of the image 200 is described by the Yscreen 214. The width or the active pixel area 204 is described by the Hsize 216 and the height of the active pixel area 204 is described by the Vsize 218.

The image 200 includes multiple lines represented by line 208. The line 208 may be, for example, scan line of a frame buffer and may be described as a group of contiguous pixels that have the same vertical axis value in the display area. The line 208 includes pixels in both the active pixel area 204 as well as the blank pixel area 202, although a line may also refer only to the spans in the active pixel area 204. Each line may be divided into one or more spans, illustrated as spans 206 and 207. The spans 207 are in the blank pixel area 202 while the spans 206 are located in the active pixel area 204. Each span 206 or 207 is a contiguous section of a line and each span 206 or 207 is generated from the same source or sources. Thus, each individual span of a line will be generated from the same streams and control information. A stream includes a data stream received from a source such as Direct Memory Access (DMA), and may be described as the information that corresponds to or generates contiguous pixels.

A slice, which is illustrated as slice 210, is a set of contiguous lines that each have spans that are related. The vertically related or vertically adjacent spans within a slice are from the same source or sources and have the same width. The slice 210 includes the lines having the spans 220 and 219, while the slice 211 includes the lines having the spans 221, 222, and 223. In this manner, the image 200 may be defined in terms of streams, spans, lines, and slices.

Figure 3:
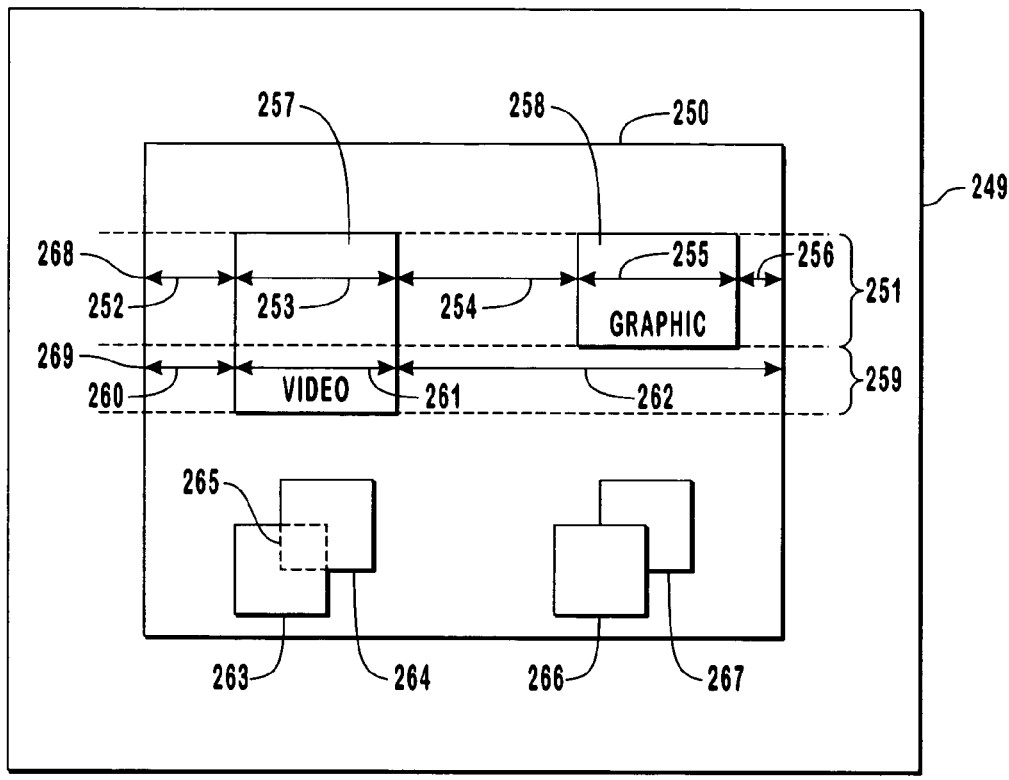
FIG. 3 illustrates the active pixel area of an image including video data, graphic data, translucent image portions and opaque image portions.

FIG. 3 is a block diagram that more specifically identifies the spans, lines and slices of a particular image. The image 250 is displayed on a display device 249, which may be a television screen, a computer monitor or other device. The image 250 includes a video 257 and a graphic 258, illustrates the concept of translucent image portions using the graphics 263 and 264, and shows the concept of opaque image portions using graphics 266 and 267.

As shown in the image 250, which does not include blank pixel area in this example, the video 257 is vertically longer than the graphic 258. Thus, the line 268 includes spans of both the video 257 and the graphic 258 while the line 269 does not include any spans of the graphic 258. Because the lines do not have similar spans, they cannot be included in the same slice. The line 268 has spans 252, 253, 254, 255, and 256, and all the lines in the slice 251 have these same spans. Because the line 269 does not have the same spans as the line 268, it is in the slice 259 rather than the slice 251, and lines in the slice 259 have the spans 260, 261, and 262.

The image portion 265, which is where the graphic 263 overlaps with the graphic 264 is translucent because the graphics are blended together on the display 249. The overlap between the graphic 266 and the graphic 267, however, is opaque because only one of the graphics is displayed while the other graphic is obscured by the other graphic. This is important when an image is analyzed to determine which sources should be used as the graphics are displayed. In accordance with the present invention, obscured graphics can be effectively ignored as the image 249 is generated.

Figure 4:
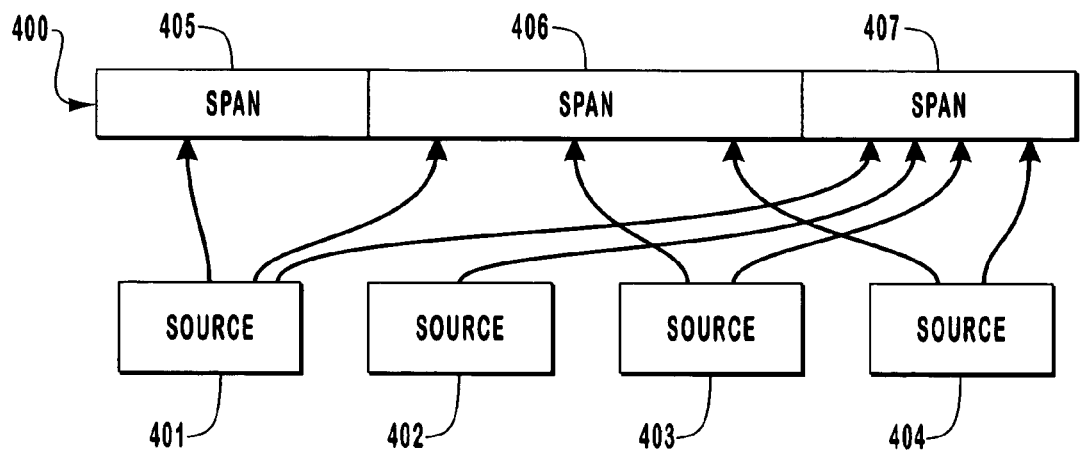
FIG. 4 illustrates both a line having multiple spans and the sources that are read as those spans are displayed.

FIG. 4 is a block diagram illustrating the generation of an image in the context of a line. FIG. 4 illustrates a line 400 having spans 405, 406, and 407. FIG. 4 also illustrates source 401, 402, 403, and 404. The data to generate the span 405 is read from the source 401. The data to formulate the span 406 is read from the source 401, the source 403 and the source 404. The data to create the span 407 is read from the source 401, 402, 403, and 404. Because some of the spans are generated from multiple sources, it is often necessary to blend the sources before they are actually displayed. A preferred system and method for blending the sources is described in reference to FIG. 7.

Generally, each span of a line can be generated from one or more sources and the data for the span 405 is read before the data for the span 406. Similarly, the data for the span 406 is read before the data for the span 407. Thus, the sources that provide data for the spans are read as the span is rasterized in one embodiment of the present invention. More simply, the present invention composites the image directly from the sources rather than using double image buffers where one image buffer is used for compositing the video while the other image buffer is used to display an image that was previously composited.

The rasterization of the span 405 includes reading the appropriate amount of data from the source 401. Generating the span 406 includes reading the appropriate data from the sources 401, 403 and 404. If the span 406 corresponds to a translucent image or graphic, then the sources for the span 406 are blended. If the span 406 corresponds to an opaque image or graphic and the data from the source 401 is to be visible, then the sources 403 and 404 are not read in this embodiment.

Because data is read directly from the data sources, it is necessary to maintain a current location within each source. After a span has been rasterized, the location is updated such that the next time a span is generated from this source, the read begins at the updated location. For example, if video is being displayed as part of an image, then the video portion of the image corresponds to vertically related spans. Each span is read once per line. It is necessary to ensure that the proper video data is read by maintaining where the data for the next span begins. The data that is read for each span corresponds to the pixel data that is needed to generate the pixels located in the span.

Figure 5:
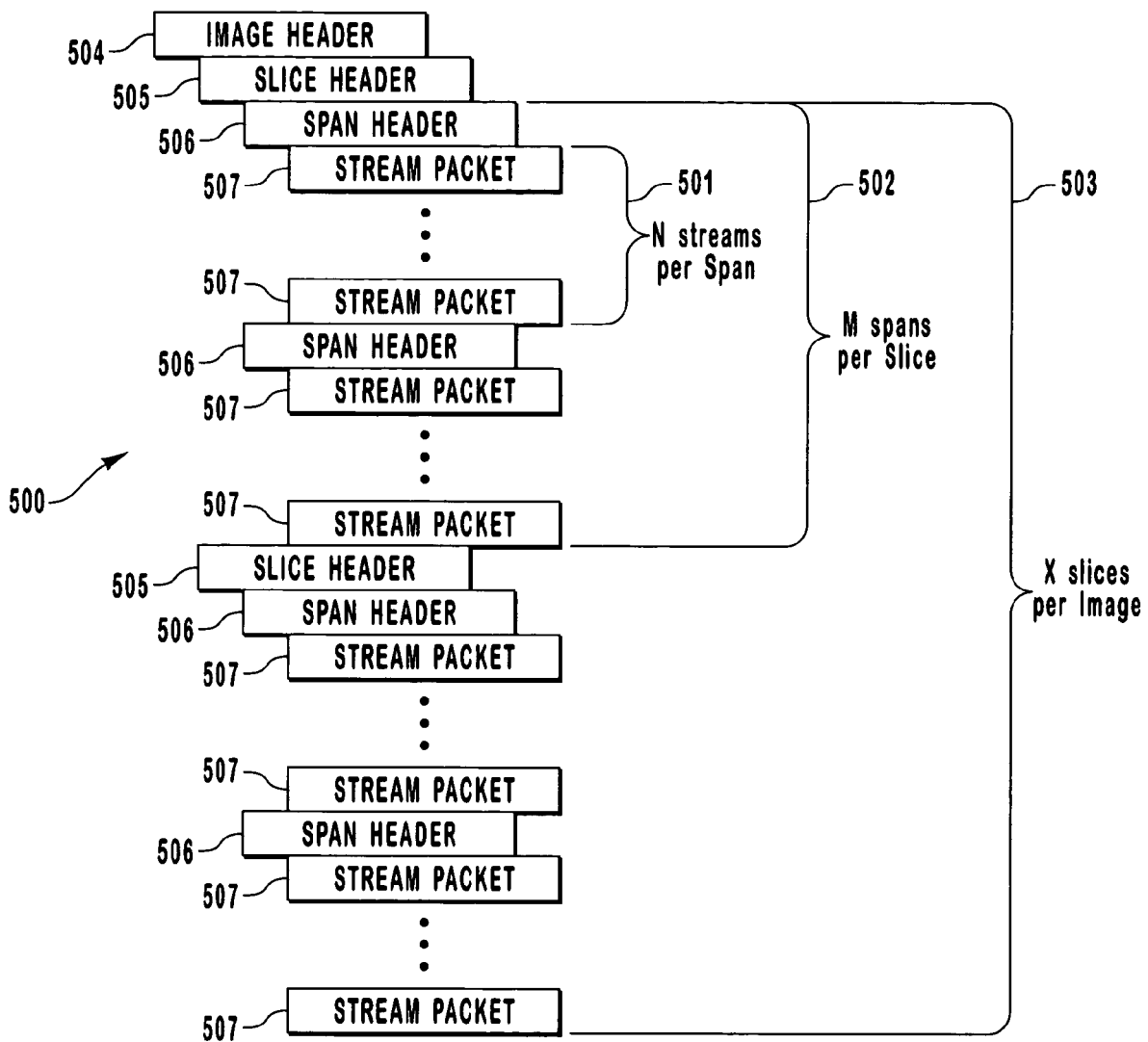
FIG. 5 illustrates a control structure that is used to store the context information of an image that is being displayed.

FIG. 5 is a block diagram of a control structure 500 that contains image context information. Usually, the image context information is parsed as Direct Memory Access (DMA) commands and data control streams. The control structure 500 includes headers that correspond to the spans, lines, and slices of an image as previously discussed. The control structure 500 includes an image header 504 that effectively defines an image. The next header in the control structure 500 is a slice header 505. The number of slice headers 505 in the control structure 500 is dependent on the number of slices in an image.

Within each slice header 505 is at least one span header 506 and within each span header 506 is at least one stream packet 507. Thus, there are N stream headers per span 501, M span headers per slice 502, and X slice headers per image 503. In memory, only one line is described per slice, but the DMA is configured to repeatedly load the same context information for each line in the slice. An offset is maintained to keep track of where the source last provided data. This is needed because as the next line of an image is displayed or rasterized, the appropriate data from the source should be accessed and the offset helps ensure that the source is providing the proper data. The context information stored in the control structure 500 also contains blending instructions.

The headers described in FIG. 5 typically identify the sources, the offset into the sources, blending instructions including multipliers, and the like. Even though the control structure 500 can be used to display images continuously, it is also able to utilize image buffers. Also, the control structure 500 is able to support both progressive displays and interlaced displays.

Figure 6:
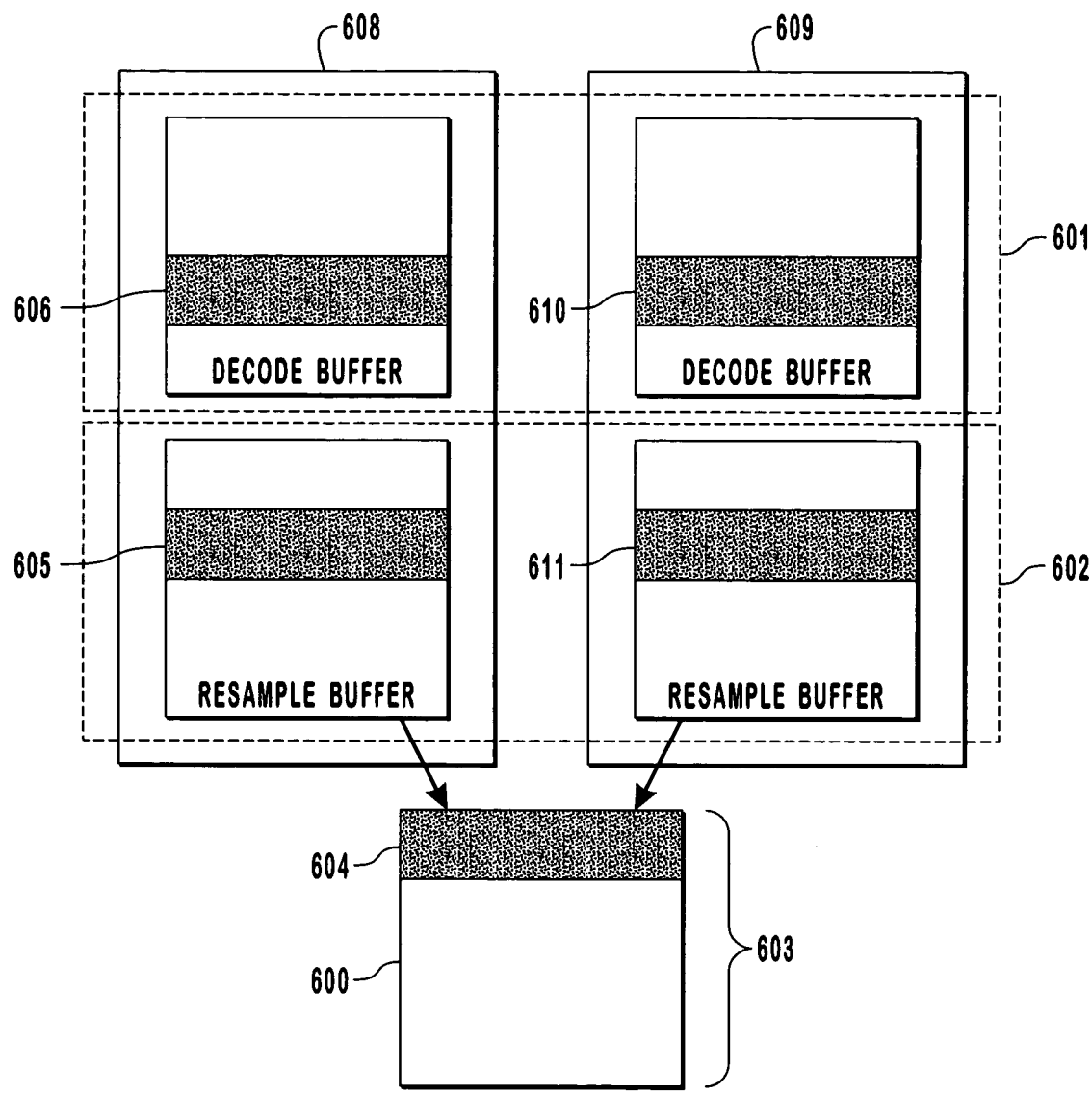
FIG. 6 illustrates a series of quarter size image buffers that are used for displaying an image on a display device.

FIG. 6 is a block diagram depicting an image that is being composited using less than full size buffers. In this example, the source of the image is a Moving Pictures Experts Group (MPEG) source. The image composited on the display is not composited using full size image buffers, rather the image is read from the source. The buffers shown in FIG. 6 are for decoding and resizing the source data. However, it is possible to also include less than full size buffers if needed. MPEG decoding occurs at step 601, resizing occurs at step 602 and compositing occurs at step 603. Each step is working on a different portion of the image in a progressive fashion.

FIG. 6 illustrates the MPEG decode output buffer 606 and the resize output buffer 605 of a source 608 and the MPEG decode output buffer 610 and the resize output buffer 611 of a source 609. FIG. 6 also shows a portion of an image 604 being displayed on the display 600. Instead of using full size buffers to accomplish the decoding and the resizing functions on the sources 608 and 609, quarter size buffers are used in this example. However, this approach to dividing the buffers can extend to various sizes.

In this example, the output image 603 is divided into four image portions. While the first image portion is being displayed on the display 600, the second image portion is being resized in the resizing output buffers 605 and 611. It is important to understand that the image 603 is composited directly from the resizing buffers and that the image 604 is not first composited into a separate image buffer, although a less than full size image buffer may be utilized. While the second image portion is being resized, a third image portion is being decoded by an MPEG unit into the MPEG decode output buffers 606 and 610.

After the third image portion has been decoded, it is resized and then composited. In this manner, the image can be displayed while lowering the amount of memory that is required to buffer the various operations that are performed on the source data. Each quarter size buffer is working on a next portion of the image and in this manner, the image is continuously displayed. Because the data is read from the resizing buffer and displayed as previously noted, a full double image buffer is not required in this instance. In this example, the buffering requirements are reduced by 75%.

Figure 7:
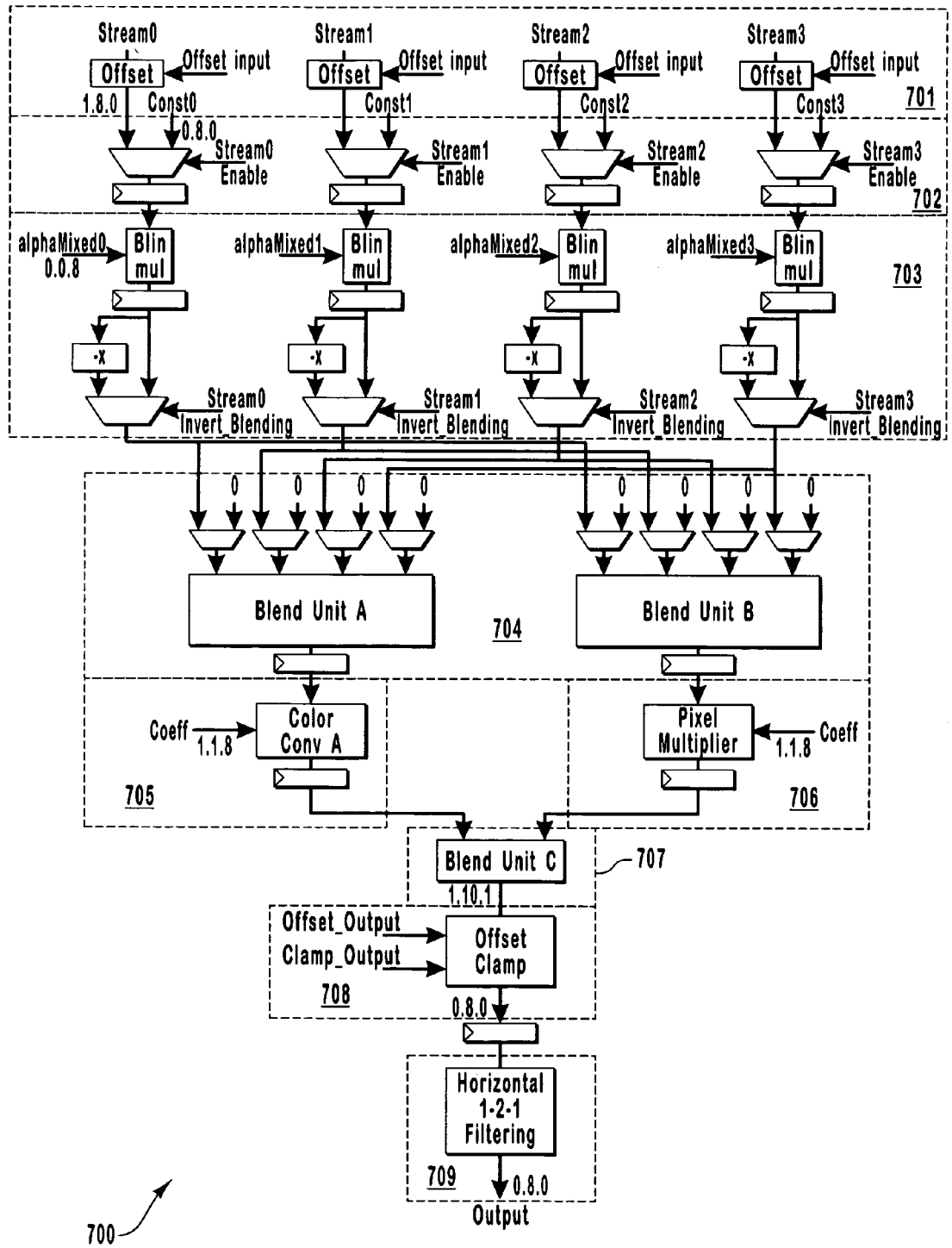
FIG. 7 is a block diagram of a blending component that receives data streams from multiple sources, blends the sources that are in the same color space, converts the blended streams to a single color space, and produces an output for display.

FIG. 7 illustrates an exemplary blending module for blending data streams from sources having different color spaces. An important feature of the blending module 700 is that the number of color space conversions is minimized. The blending module 700 is configured to receive up to four separate data streams in this example. It is understood that the blending module 700 can be configured to accept fewer or more data streams for blending.

In block 701, the data streams are received at the blending module 700. Each of the data streams is usually formatted to a particular color space, such as RGB or YUV. In the case of RGB and YUV stream data, each component in each color space uses 8 bits representing values from 0 to 255 and the component values that are received in these data streams are encoded representations of actual component values. Actual component values are often signed values and have a limited range. When the actual component values are encoded, an offset is usually applied. For example, in the YUV color space, Y (luma) is an unsigned value and the valid range of Y is 0 to 219. An offset of 16 may be applied when encoding the Y component such that the encoded range of Y is 16 to 235. Similarly, U and V components are signed values with a range of −112 to 112. An offset of 128 is applied when encoding the U and V components such that the encoded range of the U and V components is 16 to 240. In block 701, the offset applied during the encoding process is removed from the data streams to ensure that each data stream is centered around zero for signed component values or starts at zero for unsigned component values. The offset is needed in order to correctly blend data streams from different color spaces. More generally, the offset allows multipliers and alpha values to be consistently applied.

In block 702 a data stream constant may be substituted for any of the data streams. The data stream constant useful for supplying a constant color without the need for the constant source image to be stored and read from memory. Examples of a data stream constant include when a blue screen is displayed when a computer system is booting, blending to a constant color, or fading to a black transition.

In block 703, each of the data streams is pre-scaled before the data streams are blended. The scaling factor (shown as alphaMixed#) can be a constant value per data stream, an alpha value from one of the input data streams, a color key alpha value from one of the data streams, or any combination thereof and the like. A constant alpha may be used, for example, to select a certain percentage of each data stream. This is particularly useful when cross fading images from more than one source, when applying a vertical filter using multiple data streams for successive lines of the input image, and the like. An alpha value taken from one of the data streams is useful when blending an overlay on top of a background image. Also, block 703 allows the data streams to be inverted if necessary, which is especially useful when one image source is being subtracted from another image source.

In this example, block 704 contains two blending units: Blend Unit A and Blend Unit B. Each blending unit in this example simply adds together all of the pre-scaled inputs that are provided to the blending unit. In this example, Blend Unit A is intended for the data streams which are in a different color space than the display device. Blend Unit B is intended for the data streams which are in the same color space as the display device or are in color spaces that can be related via a multiplier per component, such as the YIQ color space and the YUV color space. Because each data stream is an input to each blending unit, those data stream inputs that are in a color space that is not intended for the relevant blending unit are zeroed such that they do not affect the blend. In this manner, each blending unit in block 704 blends data streams that are from the same color space. If additional simultaneous color spaces are desired, more blending units can be added.

Because the blending units are each blending data streams from a single color space and because a display device typically configured for one of those color spaces, there is only a need for a single color space converter. Block 705 is a color space converter that converts, for example RGB data to YUV data or YUV data to RGB data. It is also possible to wrap in hue, saturation, and contrast adjustments into the color space converter. The block 706 is a pixel multiplier that can individually adjust the scale of the components of the color space. This is useful for the scaling that is required to convert the YIQ color space to the YUV color space. Block 707 is a blending unit that blends the outputs of the blending units included in block 704. In one example, the block 707 is an adder that simply adds the resultant data streams, which are now in the same color space, into a single blended data stream output.

In block 708, the resulting data stream is clamped to a color space and the offset is applied such that the data stream of encoded components is again in valid ranges. In block 709, the data stream is filtered and output. In this manner, the blending module 700 is able to effectively blend data streams that are from different color spaces while minimizing the data loss that occurs when a data stream is converted to other color spaces. More specifically, the data loss that occurs when a data stream is converted to a different color space is minimized because the number of color space conversions is preferably limited to a single conversion.

Figure 8:
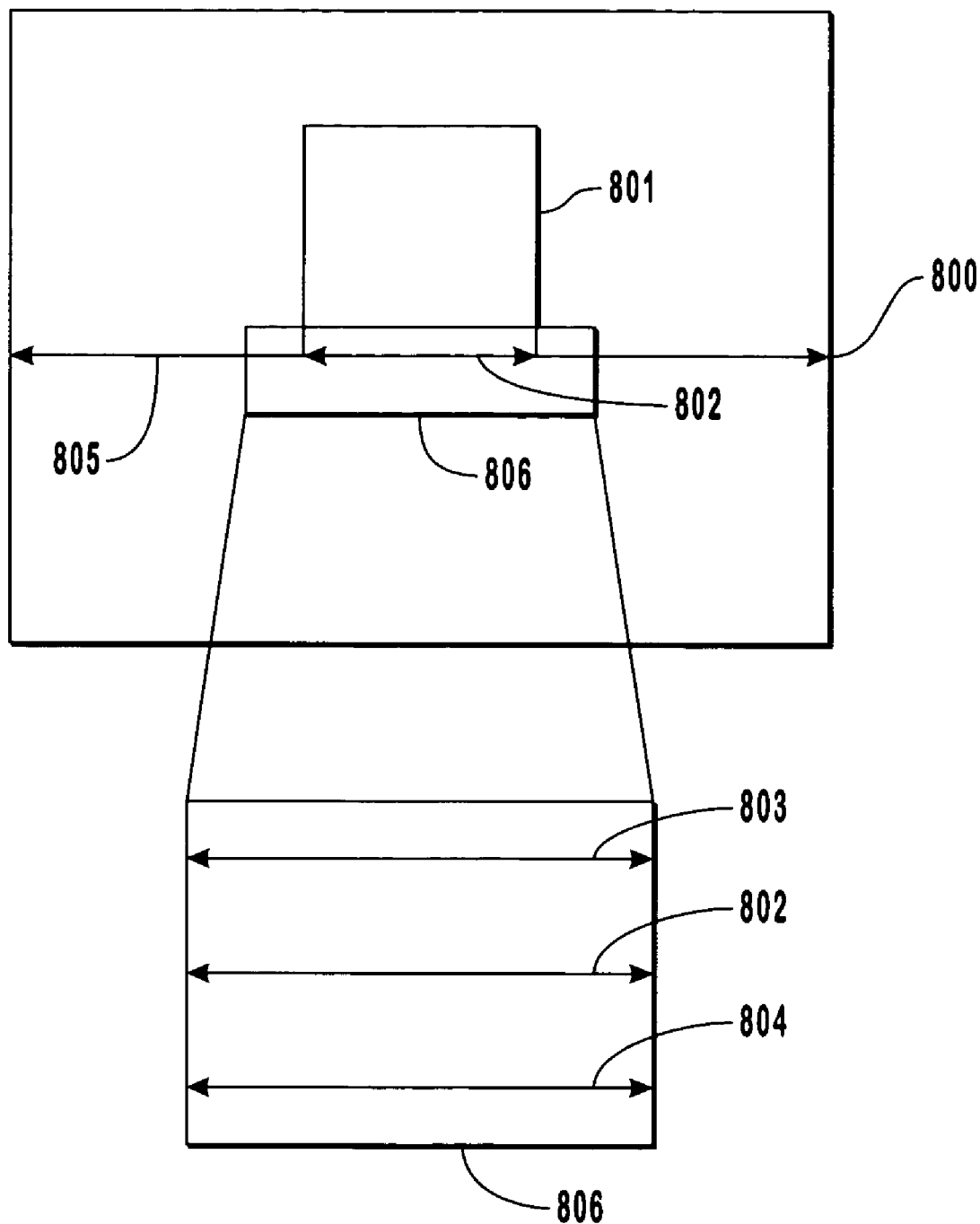
FIG. 8 is a block diagram that illustrates the data sources for eliminating the flicker that may be associated with a portion of an image.

FIG. 8 is a block diagram that illustrates a portion of an image that is subject to flickering. In this example, the display device is an interlaced device but other device types may be used. The image 800 includes, in this example, an image portion 806 that is subject to flickering. More specifically, the span 802 is on the line 805 and in an interlaced or similar display, the span 802 is shown only half of the time and is therefore subject to flickering.

The span 802 is typically an edge, for example, of a graphic 801 or other data that is being displayed. The span 802 usually has vertically adjacent spans 803 and 804. By blending the spans 803 and 804 with the span 802 when the span 802 is sent to the display, the flicker of the image portion is eliminated or reduced. Thus, the image data that corresponds to the spans 803 and 804 are used as additional sources for the generation of the span 802 as previously described. The spans 802, 803, and 804 are blended as described previously. Because the spans 802, 803, and 804 are from the same source, it is possible to blend them using any ratio. Alternatively, the span 802 may be generated or displayed on a display device using only the span 802 and span 803 as sources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computerized method for compositing an image within a computing system that includes a display device for displaying an image that is generated from a plurality of sources of image data, and wherein the system also includes resizing buffers as well as system memory storing computer-executable instructions which, when executed by a processing unit of the computing system, implement the method, wherein the method comprises acts of:
   the computing system generating a control structure having context information describing an image, the image being divided into at least a first portion, a second portion and a third portion;
   the computing system displaying the first image portion while the second image portion is being resized in a plurality of resizing buffers corresponding to the plurality of sources and while the third image portion is being decoded into a plurality of decode output buffers corresponding to the plurality of sources;
   the computing system, after resizing the second image portion, compositing and displaying the second image portion directly from the resizing buffers and without first compositing the second image portion into a separate image buffer;
   the computing system, upon decoding the third image portion, and while displaying the second image portion, resizing the third image portion within the plurality of resizing buffers;
   the computing system, after resizing the third image portion, compositing and displaying the third image portion directly from the plurality of resizing buffers and without first compositing the third image portion into a separate image buffer.

2. The computerized method as defined in claim 1, wherein the act of generating the control structure further comprises the act of dividing the image into one or more slices, each slice having one or more lines and each line having one or more spans, wherein at least one of the sources is associated with each span and wherein each source provides a data stream for the associated span.

3. The computerized method as defined in claim 2, wherein the control structure comprises:
   one or more slice headers defining one or more corresponding slices;
   for each slice header, one or more span headers defining one or more corresponding spans; and
   for each span header, one or more stream headers defining one or more corresponding data streams.

4. The computerized method as defined in claim 1, further comprising the act of loading the plurality of sources in memory of the system.

5. A computer program product comprising:
   one or more computer-readable storage media having stored computer-executable instructions which, when executed by a processing unit of a computing system, implement a method for compositing an image within the computing system that includes a display device for displaying an image that is generated from a plurality of sources of image data and resizing buffers, wherein the method implemented with the computer-executable instructions comprises acts of:
   the computing system generating a control structure having context information describing an image, the image being divided into at least a first portion, a second portion and a third portion;
   the computing system displaying the first image portion while the second image portion is being resized in a plurality of resizing buffers corresponding to the plurality of sources and while the third image portion is being decoded into a plurality of decode output buffers corresponding to the plurality of sources;
   the computing system, after resizing the second image portion, compositing and displaying the second image portion directly from the resizing buffers and without first compositing the second image portion into a separate image buffer;
   the computing system, upon decoding the third image portion, and while displaying the second image portion, resizing the third image portion within the plurality of resizing buffers;
   the computing system, after resizing the third image portion, compositing and displaying the third image portion directly from the plurality of resizing buffers and without first compositing the third image portion into a separate image buffer.

6. The computer program product defined in claim 5, wherein the act of generating the control structure further comprises the act of dividing the image into one or more slices, each slice having one or more lines and each line having one or more spans, wherein at least one of the sources is associated with each span and wherein each source provides a data stream for the associated span.

7. The computer program product defined in claim 6, wherein the control structure comprises:
   one or more slice headers defining one or more corresponding slices;
   for each slice header, one or more span headers defining one or more corresponding spans; and
   for each span header, one or more stream headers defining one or more corresponding data streams.

8. The computer program product defined in claim 5, wherein the implemented method further includes the act of loading the plurality of sources in memory of the system.

\* \* \* \* \*